(12) United States Patent
Endo

(10) Patent No.: US 7,523,113 B2
(45) Date of Patent: Apr. 21, 2009

(54) DISTRIBUTED SYSTEM, COMPUTER AND STATE TRANSITION CONTROL METHOD FOR DISTRIBUTED SYSTEM

(75) Inventor: Kotaro Endo, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 292 days.

(21) Appl. No.: 11/354,034

(22) Filed: Feb. 15, 2006

(65) Prior Publication Data

US 2006/0184947 A1 Aug. 17, 2006

(30) Foreign Application Priority Data

Feb. 16, 2005 (JP) ............................. 2005-039431

(51) Int. Cl.
*G06F 17/30* (2006.01)
(52) U.S. Cl. ................ 707/10; 707/100; 707/103 R; 707/200
(58) Field of Classification Search ............ 707/10, 707/100, 103, 200, 202, 202 R
See application file for complete search history.

(56) References Cited

U.S. PATENT DOCUMENTS 6,157,927 A * 12/2000 Schaefer et al. ......... 707/103 R 7,290,056 B1 * 10/2007 McLaughlin, Jr. .......... 709/230

OTHER PUBLICATIONS

Cabrera et al.; "Web Services Atomic Transaction (WS-Atomictransaction)"; Microsoft, IBM et al., pp. 1-21, (2005).
Lynch; "The Commit Problem"; More Consensus Problems, ISBN 1-55860-348-4, pp. 182-195, (1996).
Ben-Or; "Another Advantage of Free Choice: Completely Asynchronous Agreement Protocols"; Proceedings of the Second Annual ACM Symposium of Principles of Distributed Computing, pp. 27-29, (1983).
Notification of Reasons for Rejection mailed Jun. 3, 2008 in corresponding Japanese Application No. 2005-039431.
S. Nakajima, "Effective distribution agreement protocol using limited projection plane," Japan Institution of Electronics, Information and Communication Engineers, May 15, 1994, vol. 35, No. 5, pp. 839-846.

* cited by examiner

*Primary Examiner*—Cam-Linh Nguyen
(74) *Attorney, Agent, or Firm*—Finnegan, Henderson, Farabow, Garrett & Dunner, L.L.P.

(57) ABSTRACT

In a distributed system in which a plurality of resources execute a distributed transaction, each of the resources changes the state of an own updating process in accordance with an notification from a coordinator. In addition, each of the resources includes a termination protocol unit which collects states of updating processes of the resources, and executes a termination protocol by determining whether to commit or abort the own updating process, on the basis of the collected states of the updating processes, regardless of the notification from the coordinator.

10 Claims, 13 Drawing Sheets

DISTRIBUTED SYSTEM, COMPUTER AND STATE TRANSITION CONTROL METHOD FOR DISTRIBUTED SYSTEM

CROSS-REFERENCE TO RELATED APPLICATIONS

This application is based upon and claims the benefit of priority from prior Japanese Patent Application No. 2005-039431, filed Feb. 16, 2005, the entire contents of which are incorporated herein by reference.

BACKGROUND OF THE INVENTION

1. Field of the Invention

The present invention relates to a state transition control technique for a distributed system wherein a distributed transaction is executed among a plurality of sites on the Internet, for example.

2. Description of the Related Art

Recent developments of the Internet have begun to enable electric commerce between a company and a customer, or between companies, via the Internet. These commerce can be theoretically considered as "transaction". In the case where a transaction is done between a plurality of independent resources, such a transaction is called "distributed transaction".

In general, the transaction needs to be controlled keeping so-called ACID characteristics. Here, ACID is an acronym for the four characteristics: atomicity, consistency, isolation and duration. The distributed transaction, in many cases, is controlled by a method called "2 Phase Commit" to keep the ACID characteristics. For example, the 2 Phase Commit is adopted in the WS-Transaction specification for the WebService that enables transactions over the Internet.

The 2 Phase Commit ensures the ACID characteristics of the distributed transaction. However, there is such a problem that when failure occurs in resources relating to a transaction, the transaction may possibly be blocked. In this context, "blocking of a transaction" means the continuance of a situation in which updating processes cannot be committed nor aborted for all resources relating to a transaction. If a certain transaction is blocked, the transaction keeps holding locks of associated resources. Consequently, it is quite possible that other transactions wait forever the transaction to release the locks, and fall into a deadlock condition.

This nature of 2 Phase Commit, that is, the transaction may be blocked in case of resource failure, is an inherent problem of the 2 Phase Commit. However, conventionally, this has not been considered as a serious problem in the case where the 2 Phase Commit is used within one system. In case of failure, the administrator of the system has to eliminate a cause of failure at first. It is the primary task. After he achieves recovery from the failure, the blocking of the transaction is easiliy released. In this manner, as far as the 2 Phase Commit is used within the single system that is operated and managed in a centralized manner, the blocking of the transaction can be treated together with the failure of the system and thus the blocking nature of the 2 phase commit is not so serious.

However, in the case where the transaction is performed between a plurality of companies, the blocking of the transaction becomes a serious problem. For example, in the case where three companies, company A, company B and company C, are associated with a certain transaction, suppose that a failure occur on the site of company A, while no failure occurs in company B nor company C. In this case, blocking of the transaction can be triggered by the failure on the site of company A, and a chain of deadlocks may occur. As a result, other transactions even independent of company A may also be blocked on the site of company B or C. In this situation, it is not tolerable for company B and company C to wait for recovery on the site of company A while being unable to do anything about it. As shown above, in the case where 2 Phase Commit is used between independently operated/managed systems, blocking of transaction can occur due to failure on one site, and transaction on other sites can be blocked. The solution to this problem is already known. It is 3 Phase Commit Algorithm.

The point of change from 2 Phase Commit to 3 Phase commit is that the "prepared" state in 2 Phase Commit is divided into two states (which are referred to as W-state and P-state in this specification). And the notification for "commit" from a coordinator to a resource is divided in two stages in the order of W-state→P-state→Commit.

In 3 Phase Commit, even if failure occurs in the coordinator or resources during operation, it is possible to determine whether to commit or abort by collecting the states of the updating processes of nonfaulty resources. This procedure is referred to as "termination protocol".

According to the termination protocol of the 3 Phase Commit, in case of failure of the coordinator, a new coordinator is started up, and the states of the update processes of the nonfaulty resources are collected. If these states are all non-committing-states, the transaction is aborted, or If these states are all committing-states, the transaction is committed. Here, the term "non-committing-state" in this context refers to one of the updating-state, abort-state and W-state. The term "committing-state" refers to one of the P-state and commit-state. Otherwise when W-state and P-state exist in a mixed fashion. The new coordinator executes, once again, notifications for "commit" for the nonfaulty resources in two stages in the order of W state→P state→Commit.

when the faulty resource is recovered after the termination protocol has been executed, the updating process of the resource should be committed or aborted in accordance with the determination in the termination protocol. Attention should be paid to the fact that if the updating process of recovered resource had already be committed or aborted prior to the occurrence of failure, the algorithm of 3 Phase Commit ensures that this is consistent with the determination of the termination protocol.

As has been described above, the 3 Phase Commit is an algorithm in which the blocking of the transaction can be prevented by the termination protocol. But for the correct operation of the termination protocol, the following conditions need to be satisfied:

(1) Failure of a resource can be detected.

(2) A resource, which is once decided to have failure, cannot participate in the subsequent termination protocol.

(3) When a new coordinator is started up, it must be unique.

However, in particular, in the case of an ordinary server in which communication is executed via a network without reliability such as the Internet, none of the above conditions (1) to (3) is satisfied. Specifically, the condition (1) is not satisfied because access disability due to network failure cannot be distinguished from failure of a server. The condition (2) is not satisfied because slowdown due to a high load on a server cannot be distinguished from failure of the server. The condition (3) is not satisfied because, if network partitioning occurs, the termination protocol may be executed independently in each of the partitions. Thus, there is a problem that the 3 Phase Commit cannot be applied in the Internet environment.

More generally speaking, the network environment without reliability, such as the Internet, falls in the category of asynchronous network model, and there is such a problem that the termination protocol of the 3 Phase Commit does not correctly operate in asynchronous network model.

BRIEF SUMMARY OF THE INVENTION

The present invention has been made in consideration of the above-described circumstance, and the purpose of the invention is to provide a distributed system, computers and a state transition control method for the distributed system, consisting of an main control by a coordinator equivalent to the control by of 3 Phase Commit, and a termination protocol that correctly operates even in an asynchronous network model in place of a ordinary termination protocol of 3 Phase Commit.

The distributed system of the invention, in which a distributed transaction involves a plurality of resources, each of the plurality of resources, includes a first state transition control unit configured to change a state of an own updating process in accordance with an notification from a coordinator which coordinates a state transition of an updating process relating to the distributed transaction by 3 Phase Commit; and a second state transition control unit configured to collect states of updating processes of the plurality of resources, and to execute a termination protocol by determining whether to commit or abort the own updating process, on the basis of the collected states of the updating processes, without notification from the new coordinator.

The present invention can provide a distributed system, computers and a state transition control method for the distributed system, wherein an main control by a coordinator is equivalent to a control by of 3 Phase Commit, and a termination protocol that correctly operates even in an asynchronous network model is executed in place of a termination protocol of 3 Phase Commit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
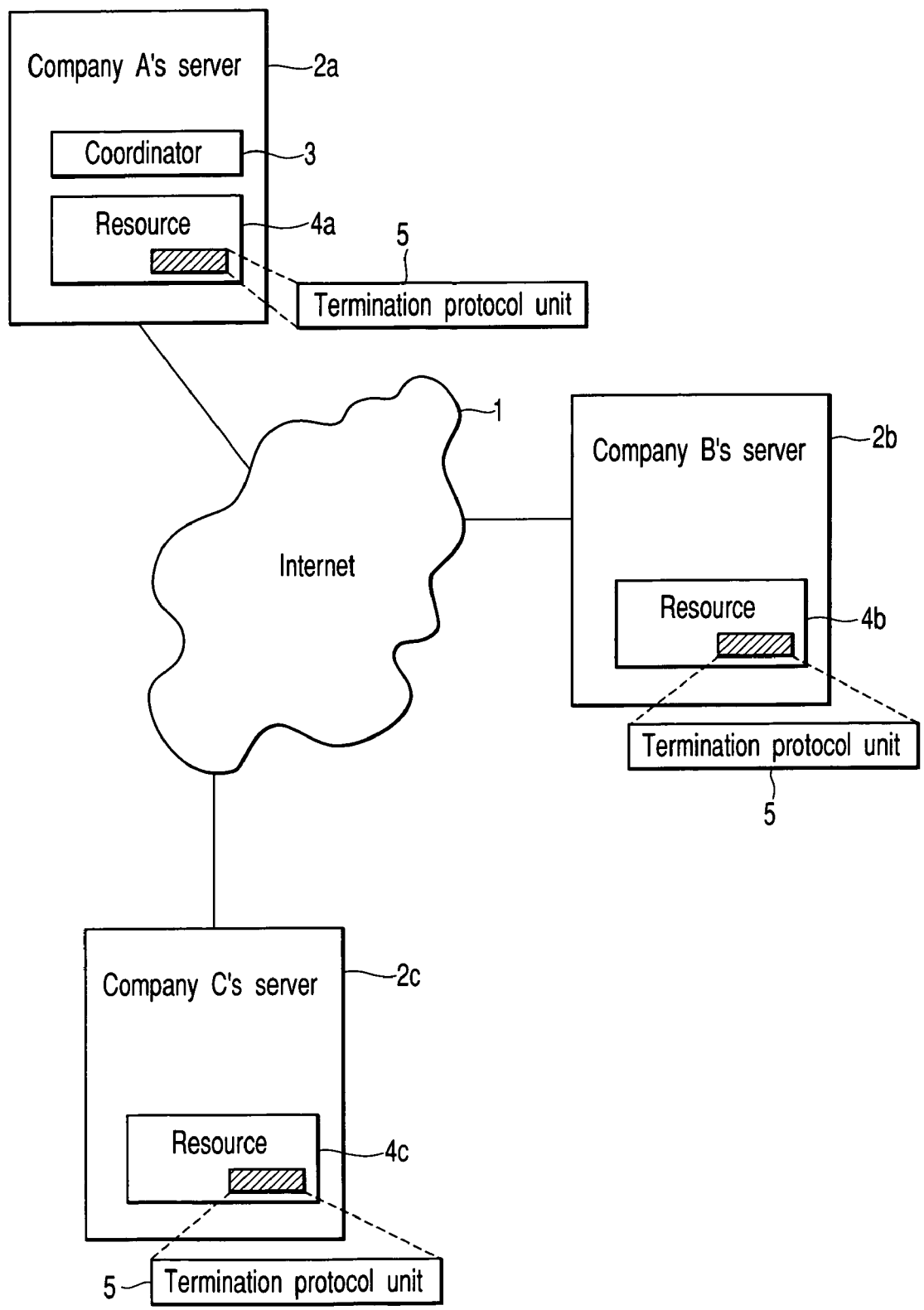
FIG. 1 illustrates a distributed transaction that is executed by a distributed system according to one embodiment of the present invention.

An embodiments of the present will now be described with reference to the accompanying drawings. FIG. 1 illustrates a distributed transaction that is executed by a distributed system according to an embodiment of the present invention. For example, suppose that three companies, company A, company B and company C, execute an on-line transaction. For this purpose, company A's server 2a, company B's server 2b and company C's server 3c are networked via the Internet so as to be communicable with each other. A coordinator 3, which coordinates the state transition of an updating process relating to the distributed transaction, is provided in the company A's server 2a. Through this transaction, resources 4a to 4c of the three companies are updated. The distributed system of this embodiment, which executes this transaction, is designed to realize a termination protocol that correctly operates also in an asynchronous network model. To achieve this, each of the resources 4a to 4c has, in addition to an main process of changing the state according to an notification from the coordinator 3, a termination protocol unit 5 which executes a proper termination protocol only by communication between the resources concerned, without the notification from the coordinator 3. This point will be described below in detail.

Figure 2:
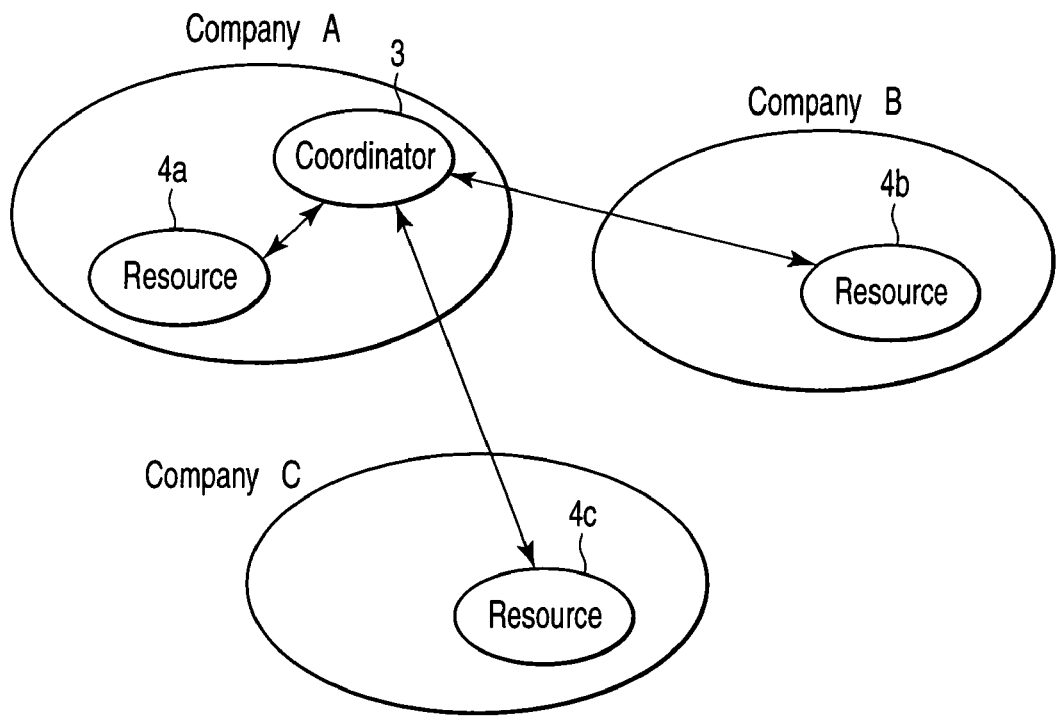
FIG. 2 illustrates communication between a coordinator and resources in 2 Phase Commit.
Figure 3:
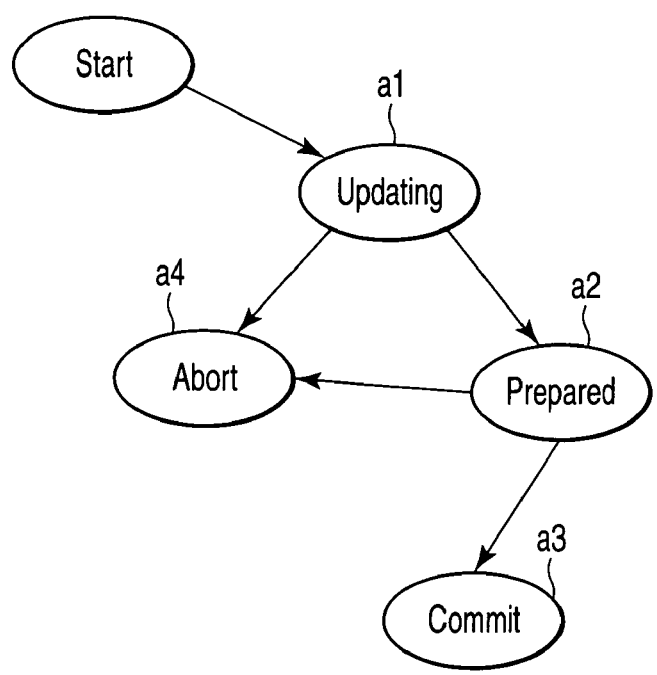
FIG. 3 illustrates a state transition of a resource in 2 Phase Commit.

To begin with, to help understand the operational principle of the termination protocol unit 5, a typical procedure of 2 Phase Commit is described referring to FIG. 2 to FIG. 5. As is shown in FIG. 2, in 2 Phase Commit, each of the resources 4a to 4c communicates with the coordinator 3 and changes own state in accordance with notifications from the coordinator 3. The state transition of each of the resources 4a to 4c are shown in FIG. 3. The main path starts at start-state, goes to updating-state (a1), goes to prepared-state (a2), finally goes to commit-state (a3). Other paths diverted at updating-state (a1) or prepared-state (a2) go to abort-state (a4). The prepared-state is a suspended state immediately prior to the completion of the updating process. In the prepared state, the process can arbitrarily be committed or aborted.

Example flows in 2 Phase Commit are shown as follows.

(1) A flow in the case where the transaction is committed:

a. An updating process is executed in each of the resources 4a to 4c of companies A, B and C, and each resource changes to the prepared state and notifies the coordinator 3 of the transition.

b. Since the coordinator 3 knows that the updating processes in the three companies have changed to the prepared state, the coordinator 3 determines that the transaction is to be committed, and sends notifications to commit the updating processes to the respective resources 4a to 4c.

c. Upon receiving the notification, each of the resources 4a to 4c of the three companies commits the updating processes.

(2) A flow in the case where the transaction is aborted:

a. An updating process is executed in each of the resources 4b and 4c of companies B and C, and each of the resources 4b and 4c changes to the prepared state and notifies the coordinator 3 of the transition. On the other hand, an updating process in the resource 4a of company A fails and is aborted, and the resource 4a notifies it to the coordinator.

b. Since the coordinator 3 is notified that the updating process in company A is aborted, the coordinator 3 determines that the transition is to be aborted, and sends an notification to abort the updating process in each of the resources 4b and 4c of companies B and C.

c. Upon receiving the notifications, each of the resources 4b and 4c of companies B and C aborts the updating processes.

Figure 4:
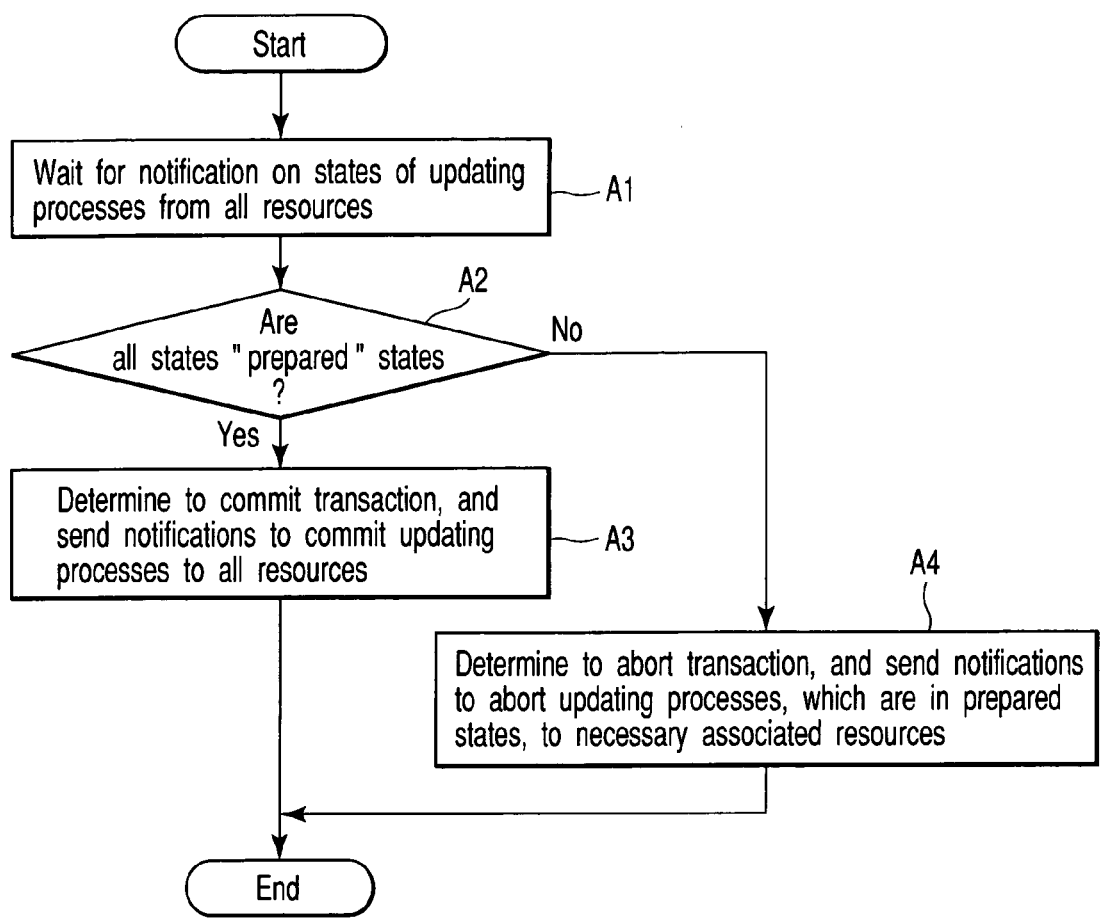
FIG. 4 is a flow chart illustrating an operational procedure of the coordinator in 2 Phase Commit.

FIG. 4 illustrates an operational procedure of the coordinator 3 for coordinating the state transition in 2 Phase Commit as described above.

The coordinator 3 waits for notification on the states of the updating processes from all the resources (step A1). If the states of all the updating processes are known to be the prepared states (YES in step A2), the coordinator 3 determines to commit the transaction, and sends notifications to commit the updating processes (step A3). On the other hand, if any one of the updating processes is known not to be the prepared state (NO in step A2), the coordinator 3 determines to abort the transaction, and sends notifications to abort the updating processes, to the resources which are in the prepared states (step A4).

Figure 5:
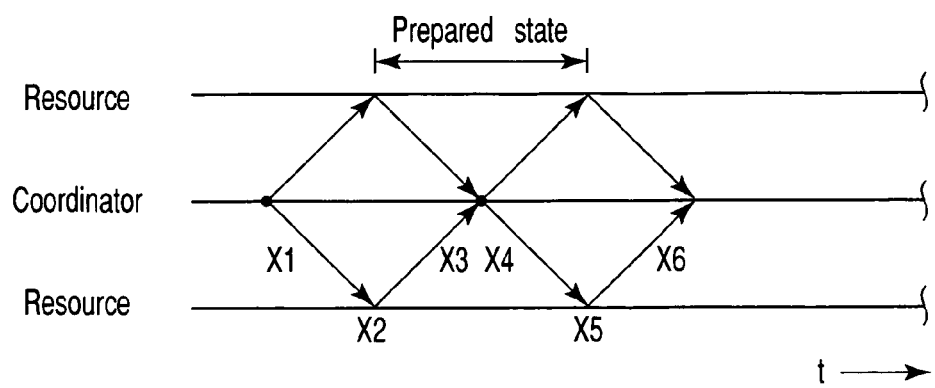
FIG. 5 is a timing chart illustrating a transaction between a coordinator and resources in 2 Phase Commit.

FIG. 5 is a timing chart illustrating communications between the coordinator 3 and resources 4a to 4c in 2 Phase Commit. The coordinator 3 instructs start of updating processes to the resources 4a to 4c (X1 in FIG. 5), and the resources 4a to 4c execute the updating processes (X2 in FIG. 5) and return the execution result (i.e. the prepared state or not) to the coordinator 3 (X3 in FIG. 5).

Upon receiving all the execution result, the coordinator 3 determines whether to commit or abort the transaction, and sends notifications to the resources 4a to 4c (X4 in FIG. 5). According to the notifications, the resources 4a to 4c commit or abort the updating processes (X5 in FIG. 5) and informs the coordinator 3 of the completion (X6 in FIG. 5).

The above-described flow relates to the process in which no stopping failure occurs. Next, a description is given of the case in which the transaction is blocked due to occurrence of failure.

(3) A flow in the case where the transaction is blocked:

a. An updating process is executed in each of the resources 4a to 4c of companies A, B and C, and each resource changes to the prepared state and notifies the coordinator 3 of the transition.

b. Stopping failure has occurred in the company A's server 2a, and the resource and coordinator in company A are rendered inoperable.

c. As a result, the updating processes of the resources 4b and 4c of companies B and C are blocked in the prepared states.

Attention should be paid to the fact that the updating processes of the resources 4b and 4c of companies B and C cannot be arbitrarily decided to be committed or aborted. The reason is that it is not possible to distinguish, with information only on the states of the updating processes in companies B and C, between the case where the transaction is to be committed and the case where the transaction is to be aborted. The updating process in company A might have been committed, or the updating process in company A might have been aborted. In order to keep the atomicity of the transaction, it is necessary to detect the final state of the updating process of the resource 4a after company A's server 2a is recovered from failure, and it becomes possible to determine to commit or abort the updating processes of the resources of companies B and C on the basis of it.

Figure 6:
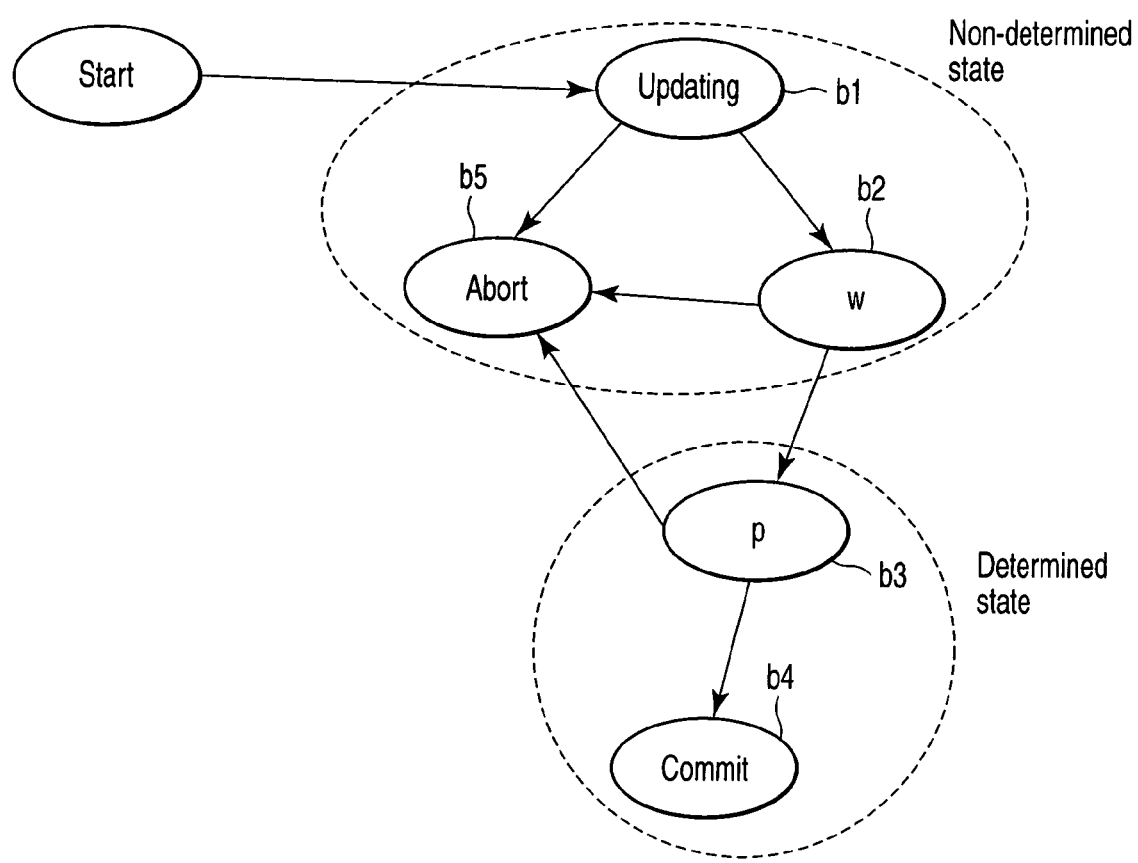
FIG. 6 illustrates a state transition of a resource in 3 Phase Commit.
Figure 7:
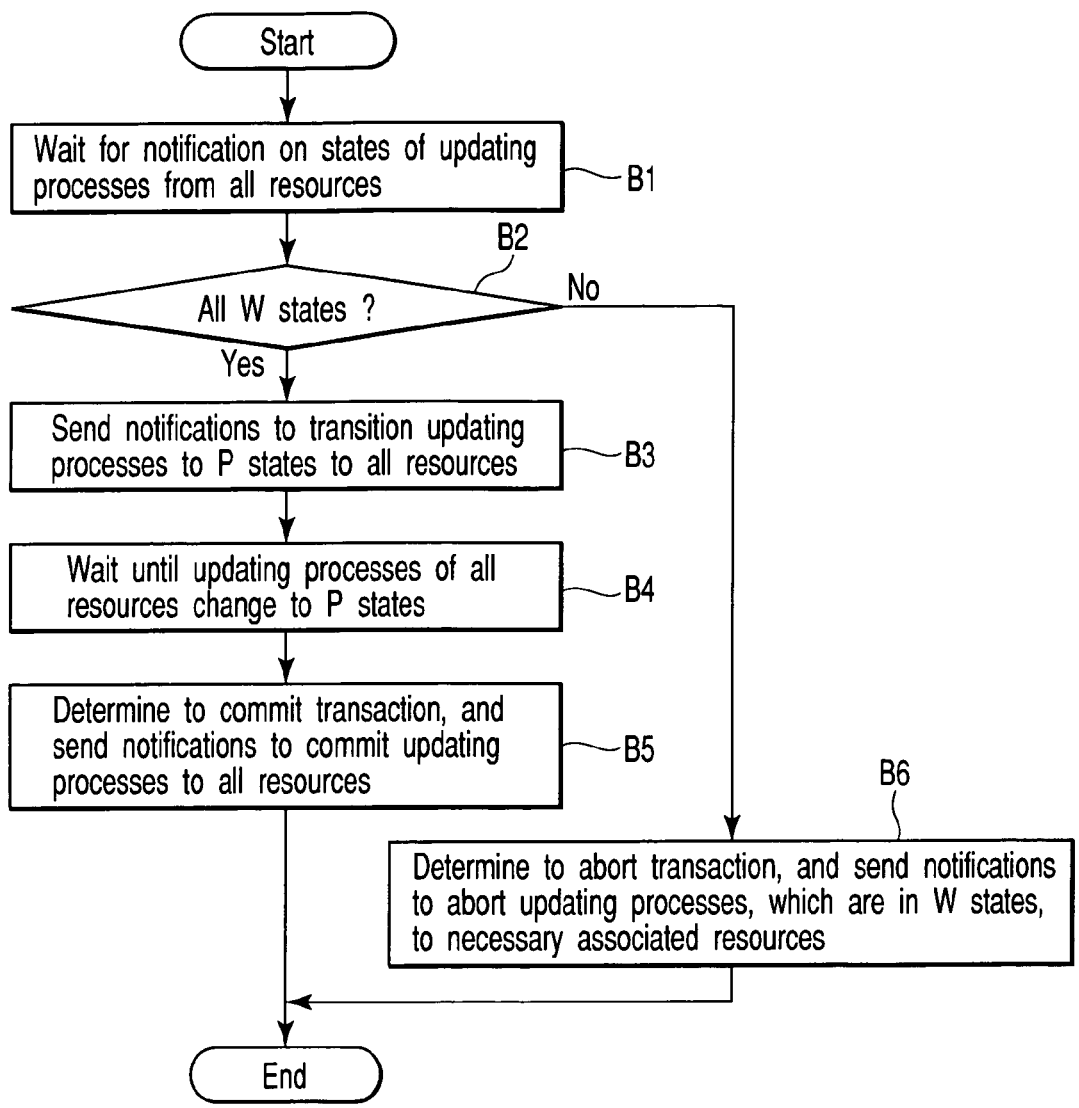
FIG. 7 is a flow chart illustrating an operational procedure of the coordinator in 3 Phase Commit.
Figure 8:
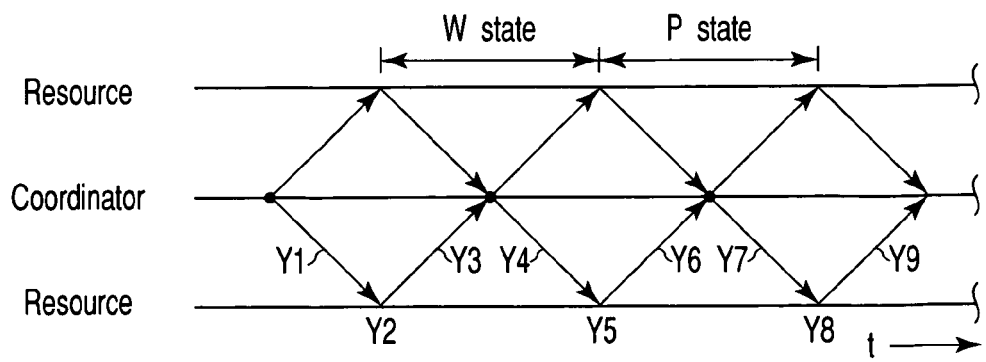
FIG. 8 is a timing chart illustrating a transaction between a coordinator and resources in 3 Phase Commit.

Next, with reference to FIG. 6 to FIG. 8, in order to help understand the operational principle of the termination protocol unit 5, a brief description is given of 3 Phase Commit, which is the solution to the problem of 2 Phase Commit, i.e. the problem that the transaction is blocked.

As is shown in FIG. 6, in 3 Phase Commit, the prepared state in 2 Phase Commit is divided into W-state (b2) and P-state (b3), and the coordinator 3 sends the notifications for "commit" in two stages in an order of W state→P state→commit to the resources 4a to 4c. FIG. 7 illustrates an operational procedure of the coordinator 3 for coordinating the state transition in 3 Phase Commit.

The coordinator 3 waits for notification on the states of the updating processes from all the resources (step B1).

If all the states of the updating processes are known to be W states (YES in step B2), the coordinator 3 sends notifications for changing the state of the updating processes to P states (step B3) and waits until the updating processes of all resources change to the P states (step B4). If all the states of the updating processes are known to be P states, the coordinator 3 determines that the transaction is to be committed, and sends notifications to commit the updating processes (step B5).

On the other hand, if any one of the updating processes is known not to be in the W state (NO in step B2), the coordinator 3 determines that the transaction is to be aborted, and sends notifications to abort the updating processes, to the resources which are in the W states (step B6).

FIG. 8 is a timing chart illustrating communications between the coordinator 3 and resources 4a to 4c in 3 Phase Commit. The coordinator 3 instructs start of updating processes to the resources 4a to 4c (Y1 in FIG. 8), and the resources 4a to 4c execute the updating processes (Y2 in FIG. 8) and return the execution result (i.e. the W state or not) to the coordinator 3 (Y3 in FIG. 8). Upon receiving all the execution result, assume that the W states are returned to the coordinator 3, the coordinator 3 sends the notifications for changing the state of the updating processes to the P states (Y4 in FIG. 8). Each of the resources 4a to 4c, which receives the notification, changes the state of the updating processes to the P state (Y5 in FIG. 8), and notifies the coordinator 3 of the completion of transition (Y6 in FIG. 8). When the coordinator 3 is informed of the completion of transition to the P state of all the resources, it sends notifications to commit the transaction to the resources 4a to 4c (Y7 in FIG. 8). Each of the resources 4a to 4c commits the updating process according to the notification (Y8 in FIG. 8) and informs the coordinator 3 of the completion (Y9 in FIG. 8).

The 3 Phase Commit is characterized in that even if failure occurs during operation in the coordinator 3 or in the resources 4a to 4c, it can be determined whether to commit or abort by collecting the states of the updating processes of the nonfaulty resources (termination protocol)

However, as mentioned above, in the asynchronous network model, i.e. in the network environment without reliability, such as the Internet, there is a problem that the ordinary termination protocol of the 3 Phase Commit does not correctly operate. Next, a commit protocol of the present invention, which can solve this problem, is described.

The commit protocol of this invention consists of a main control by the coordinator equivalent to the control of 3 Phase Commit, and a new termination protocol which correctly operates even in the asynchronous network model. Thereby, the commit protocol of this invention can also be used in transactions via the Internet. In short, the termination protocol unit 5, which is installed in each of the resources 4a to 4c, executes the newly provided termination protocol of the present invention.

Figure 9:
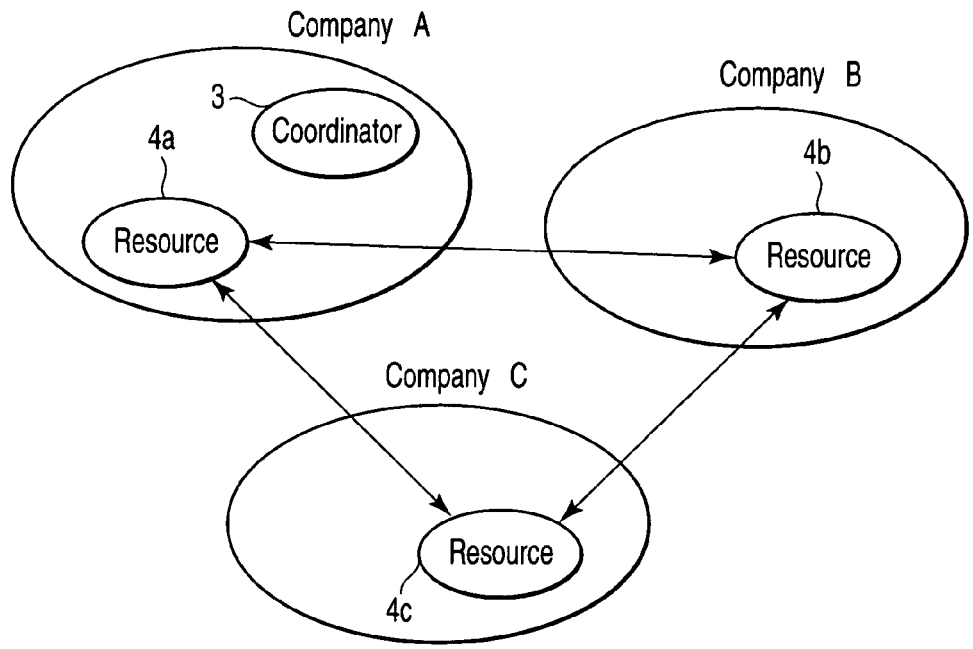
FIG. 9 illustrates communication between a coordinator and resources at a time of a termination protocol of the distributed system of the present embodiment.

As illustrated in FIG. 9, in the termination protocol that is executed by the termination protocol unit 5, the coordinator 3 is not involved, and the termination protocol unit 5 communicates directly each other among the resources 4a to 4c. Flow charts of termination protocols in the respective resources are symmetric, and includes parts where random choices are executed. Theoretically, the termination protocol is equivalent to the Ben-Or agreement algorithm which is one of agreement algorithms in the asynchronous network model (reference document: Ben-Or, Another Advantage of Free Choice: Completely Asynchronous Agreement Protocols, Proceedings of the Second Annual ACM Symposium on Principles of Distributed Computing, pp. 27-30, 1983).

The flow of the termination protocol in each resource is shown as follows.

(1) If termination protocol unit 5 knows that it exists a resource where the state of the updating process is either "commit-state", "abort-state" or "updating-state", the termination process itself is obvious, so "commit" or "abort" is immediately decided.

(2) Otherwise, the termination protocol unit 5 considers the states of the updating processes as initial values of the Ben-Or's agreement algorithm and the agreement protocol is executed. If the agreement in the W state is reached, the transaction is aborted, or If the agreement in the P state is reached, the transaction is committed.

The Ben-Or's agreement algorithm ensures that the updating processes in all the resources are uniformly aborted when the initial values are all W states, or that the updating processes in all the resources are uniformly committed when the initial values are all P states, otherwise that the updating processes in all the resources are uniformly committed or aborted. Thereby, the atomicity of the transaction is ensured.

In the termination protocol, if the number of faulty resources is less than half the number of all resources, it is possible to determine whether to commit or abort the transaction. If the number of faulty resources reaches half the number of all resources before the termination protocol is completed, the termination protocol is blocked and accordingly the transaction is blocked. However, if the faulty resources are recovered, these resources can arbitrarily participate in the termination protocol once again. Thus, if the faults are recovered and the number of nonfaulty resources becomes greater than half the number of all resources, the termination protocol of the present invention can determine whether to commit or abort the transaction.

In addition, this termination protocol can be started at an arbitrary point in protocol. Thus, there are various methods of starting the termination protocol as reasonable developments of the present invention. For example, even when the termination protocol is started in the situation without any failure of resources, the termination protocol correctly operates. However, by the start of the termination protocol, the transaction, which can normally be committed, would be aborted. So, in the case when the transaction is expected to be completed by the main control of the coordinator, it is not efficient to start the termination protocol.

For example, using an pre-configured time-out value, the termination protocol may be started when the coordinator detects time-out in any one of resources or when any one of resources detects time-out of the coordinator. According to this method, the balance in total efficiency can be controlled by configuring the time-out value. Alternatively, if an external failure detection mechanism is provided, the termination protocol may be started by this mechanism.

The operational procedure of the coordinator 3 in this embodiment is the same as that of 3 Phase Commit as shown in FIG. 7. The coordinator 3 does not participate in the termination protocol that is executed by the termination protocol unit 5, and the termination protocol is executed by communication among the resources. The termination protocol unit 5 executes the termination protocol sequentially in steps indicated by numbers starting at 1.

In each step, the states of the updating processes of other resources are collected by communicating with other resources, until the number of collected states (including own state) is greater than half the number of all resources.

Figure 10:
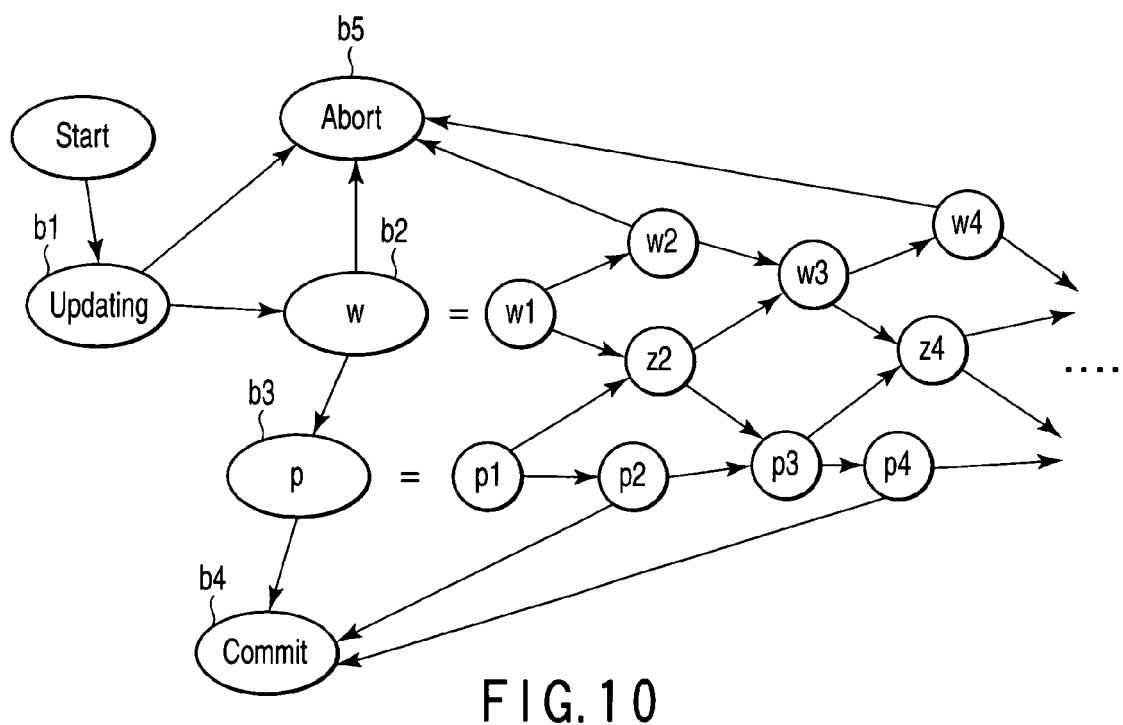
FIG. 10 illustrates a state transition of the resource in the distributed system of the embodiment.

The state of the own updating process in the next step is determined by the collected state in the current step. The states of the updating process is shown in FIG. 10. In addition to the states in 3 Phase Commit, there are states indexed by step numbers. More precisely, there are indexed W-states, indexed P-states and indexed Z-states (indexes are only even numbers). The W1 state and P1 state, which have step number "1", is equivalent to the W-state and P-state, respectively.

Figure 11:
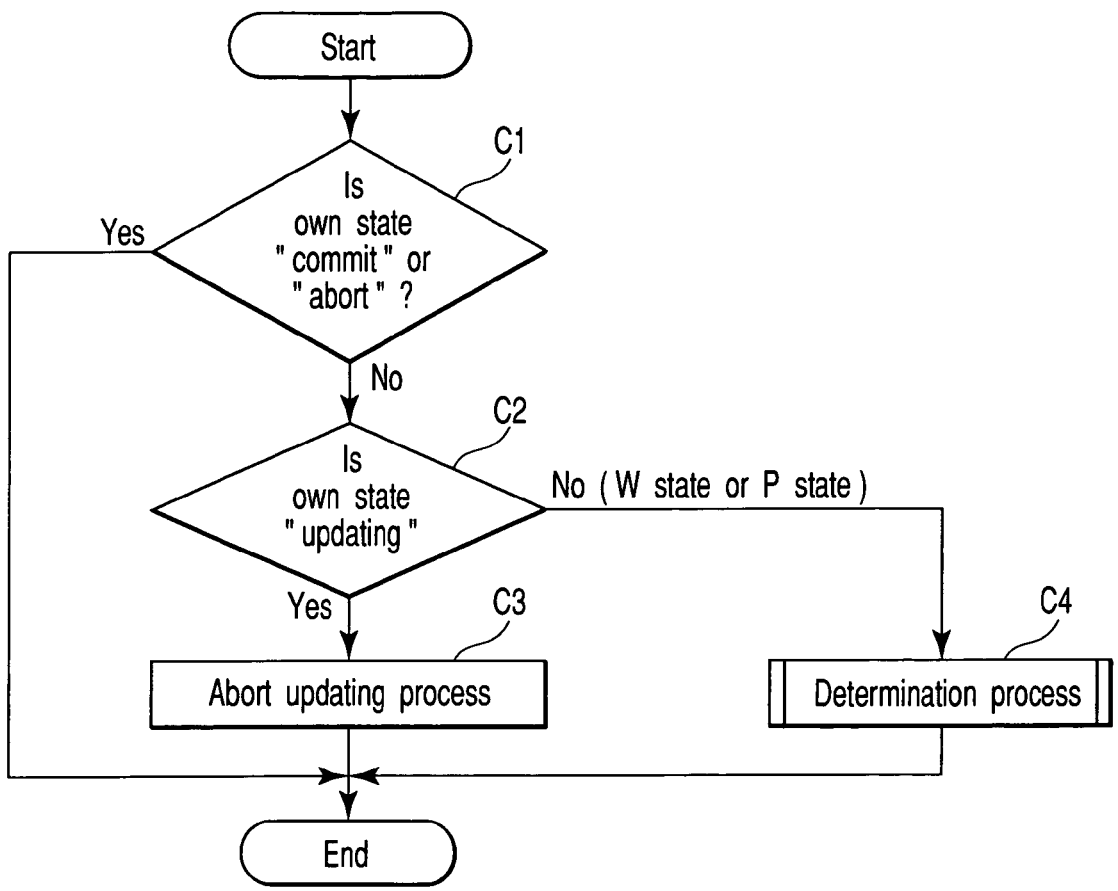
FIG. 11 is a basic flow at the time of the termination protocol of the distributed system of the embodiment.
Figure 12:
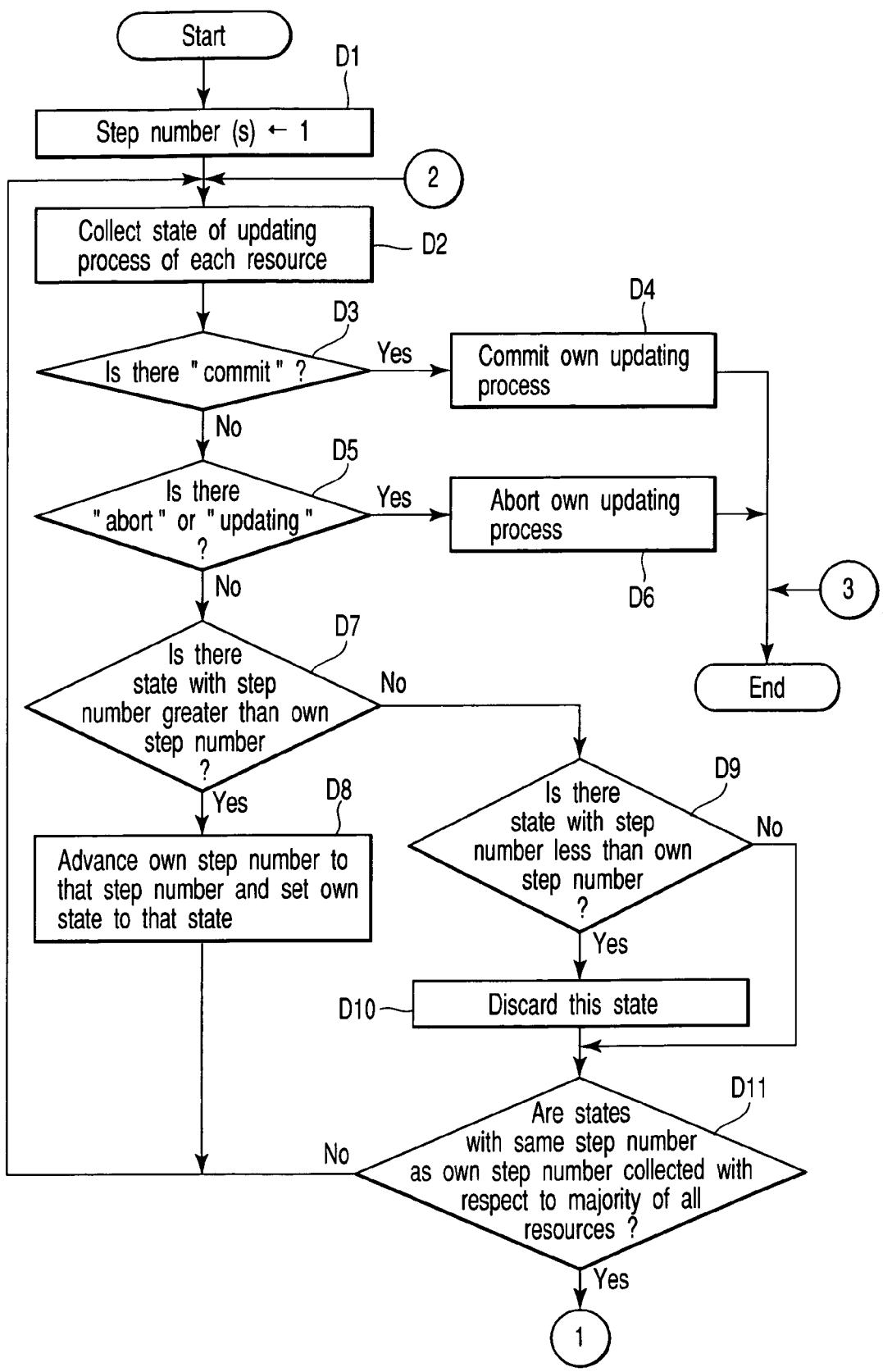
FIG. 12 is a detailed flow (½) at the time of is the termination protocol of the distributed system of the embodiment.
Figure 13:
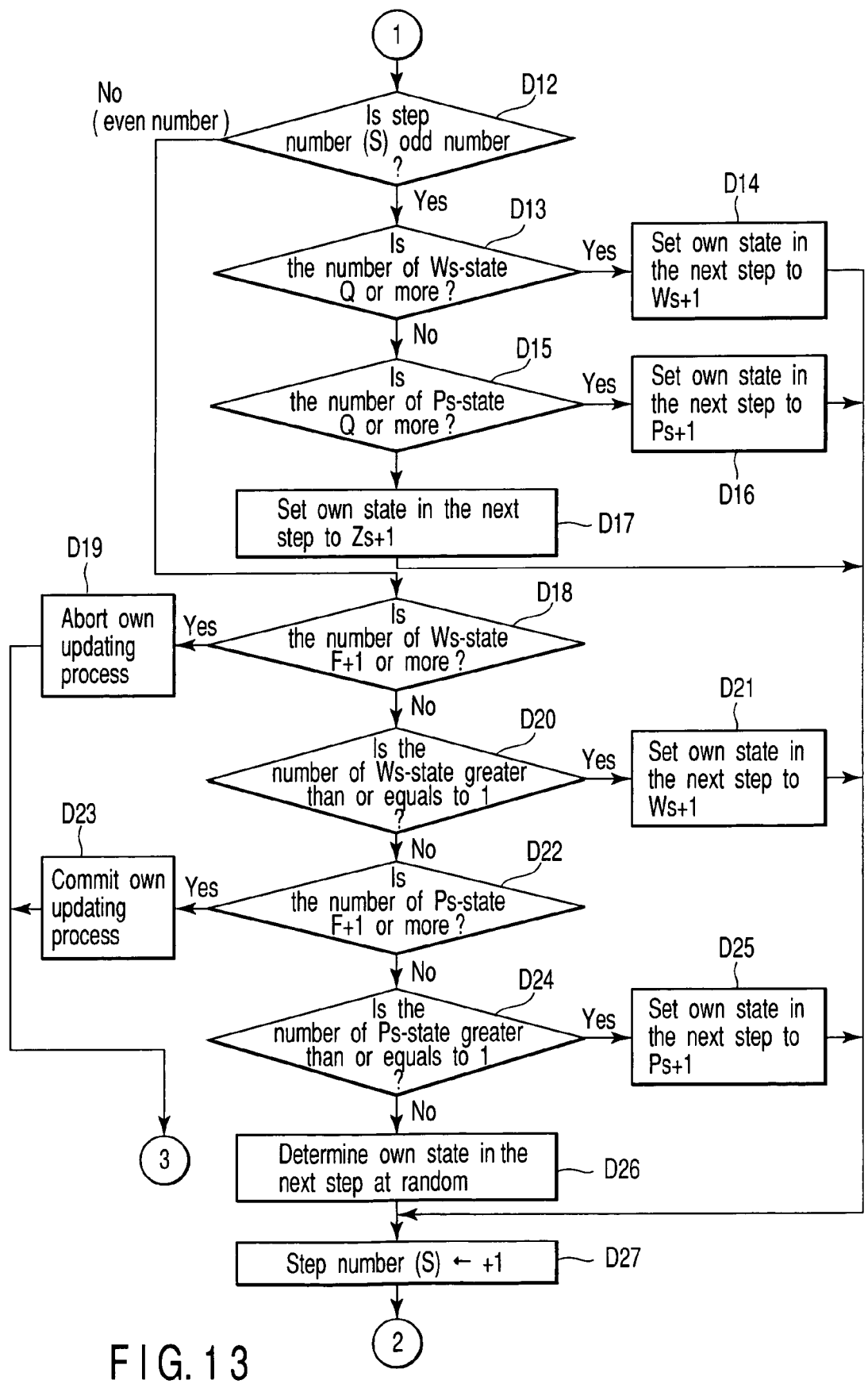
FIG. 13 is a detailed flow (²⁄₂) at the time of the termination protocol of the distributed system of the embodiment.

Next, referring to flow charts of FIG. 11 to FIG. 13, precise operational procedure of the termination protocol unit 5 is described. In the description below, "S" indicates the index of steps, "N" indicates the number of all resources, "Q" indicates a minimum number which satisfies $N<2*Q$, and "F" is $N-Q$.

FIG. 11 shows the basic flow. If own state is "commit" or "abort" (YES in step C1), the termination protocol in the resource is completed. On the other hand, if own state is "updating" (NO in step C1, YES in step C2), the updating process is aborted (step C3), and the termination protocol in the resource is completed. If own state is W state or P state (NO in step C2), the flow goes to a determination process, which is illustrated in detail in FIG. 12 and FIG. 13.

In the determination process, the step number is set to 1 (step D1) at first, the termination protocol unit communicates with other resources to collect the states (step D2). If there is "commit" in the collected states (YES in step D3), the own updating process is committed (step D4) and the termination protocol in the resource is completed. If there is "abort" or "updating" in the collected states (YES in step D5), the own updating process is aborted (step D6) and the termination protocol in the resource is completed.

If the collected states include a state with a greater step number than the own step number (YES in step D7), the process advances to that step number and own state is set to that state (step D8) and the process beginning from step D2 is repeated. If the collected states include a state with a less step number than own step number (YES in step D9), this state is ignored and discarded (step D10).

If the states with same step number as own step number (including own state) are collected from the majority of all resources (YES in step D11), own state in the next step is determined on the basis of the following determination criteria, and the process advances to the next step.

If the step number S is an odd number (YES in step D12), collected states are either Ws or Ps and the number of collected states is Q or more. If the number of Ws-state is Q or more (YES in step D13), own state in the next step is set to Ws+1 (step D14). If the number of Ps-state is Q or more (YES in step D15), own state in the next step is set to Ps+1 (step D16). In other cases, own state in the next step is set to Zs+1 (step D17). If the above-described state transition is finished, the step number is incremented (step D27) and the process from step D2 is repeated.

On the other hand, if the step number S is an even number (NO in step D12), collected states are one of Ws or Ps or Zs and the number of collected states is Q or more.

In addition, there is no case in which Ws and Ps appear at the same time. The reason is that it is not possible that Ws−1 and Ps−1 become the majority at the same time in the previous step.

If the number of Ws-state is F+1, or more (YES in step D18), the own updating process is aborted (step D19). If the number of Ws-state is less than F+1 (NO in step D18) but is greater than or equals to 1 (YES in step D20), own state in the next step is set to Ws+1 (step D21).

If the number of Ps-state is F+1, or more (YES in step D22), the own updating process is committed (step D23).

If the number of Ps-state is less than F+1 (NO in step D22) but is greater than or equals to 1 (YES in step D24), own state in the next step is set to Ps+1 (step D25). In the other cases (NO in step D24), own state in the next step is randomly set to either Ps+1 or Ws+1 (step D26).

By the above-described procedure, the termination protocol are executed consistently among resources, without using the coordinator 3.

In the meantime, according to the above-described procedure, no blocking of the transaction occurs under the condition that the number of non-faulty resources is the majority of all resources. However, when the number of faulty resources reaches half of the number of all resources, blocking of the transaction also occurs. In order to resolve this problem, "quorum sites" can be introduced. It is described below.

Figure 14:
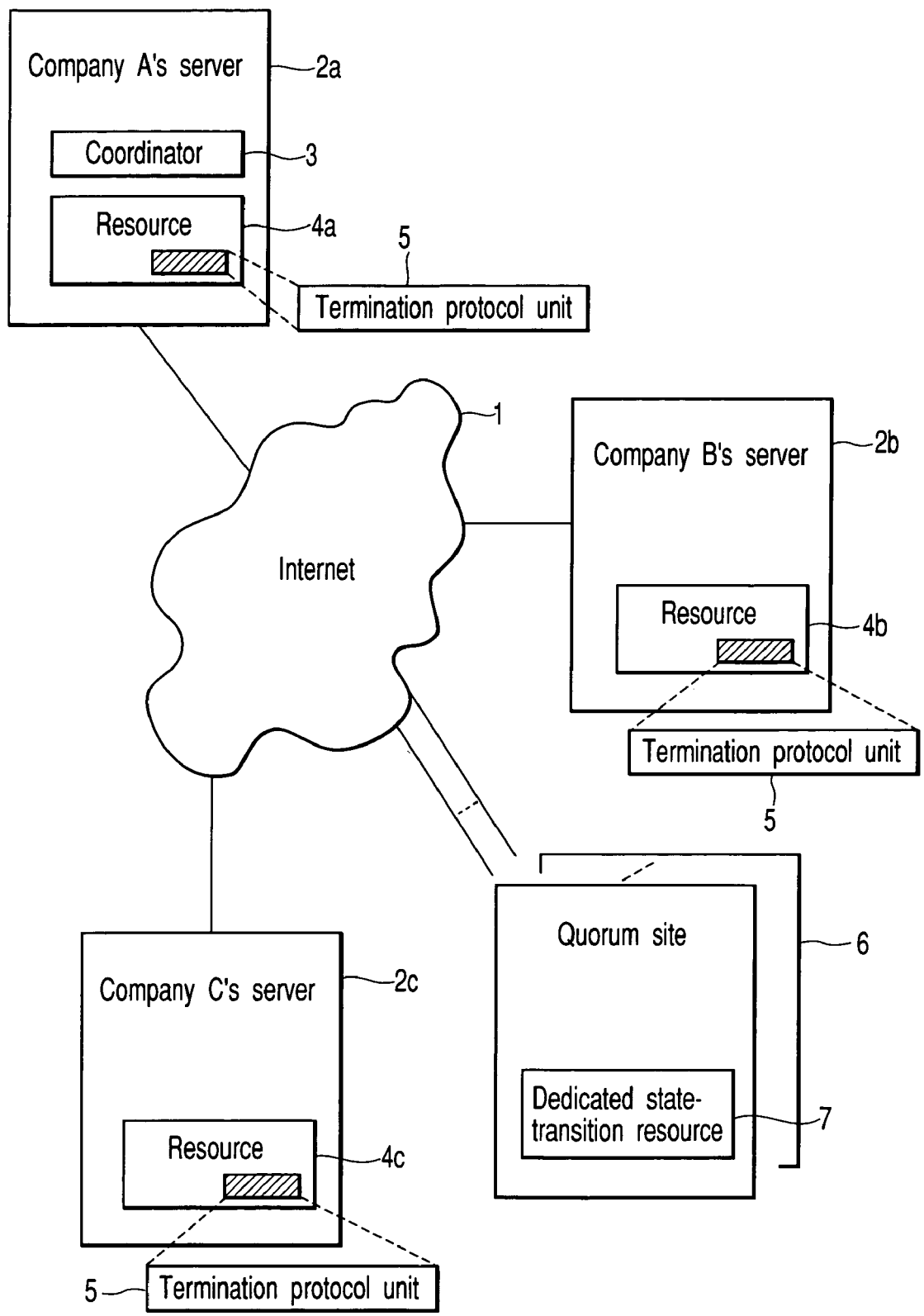
FIG. 14 shows a distributed system in a case where quorum sites according to the embodiment are introduced.

As is shown in FIG. 14, a quorum site 6 is a server that is disposed on the Internet 1. The quorum site 6 provides a resource (dedicated state-transition resource 7) that does not execute real updates and executes only the state transition of the updating process. Since the updating process does nothing real, the resource does not substantially have an updating state, and its initial state can be considered as W-state. Including this quorum resource in the transaction, and applying the invented commit protocol described, the above-mentioned problem can be solved.

Specifically, if the number of proper resources relating to a certain transaction is N, an (N−1) number of resources in quorum sites 6 are selected, and these resources 7 are made to participate in the distributed transaction. Then, the total number of resources becomes 2N−1, and no blocking of the transaction occurs with respect to faults of up to (N−1) resources. Accordingly, if no fault occurs in the quorum sites, blocking of the transaction never occurs, except all original resources become faulty. The (N−1) resources in the quorum sites can be selected from a single quorum site, or can be selected from a plurality of servers which are geographically separated. If resources of quorum sites are selected so as to obtain sufficient reliability as a whole, the above-mentioned solution is realized.

Figure 15:
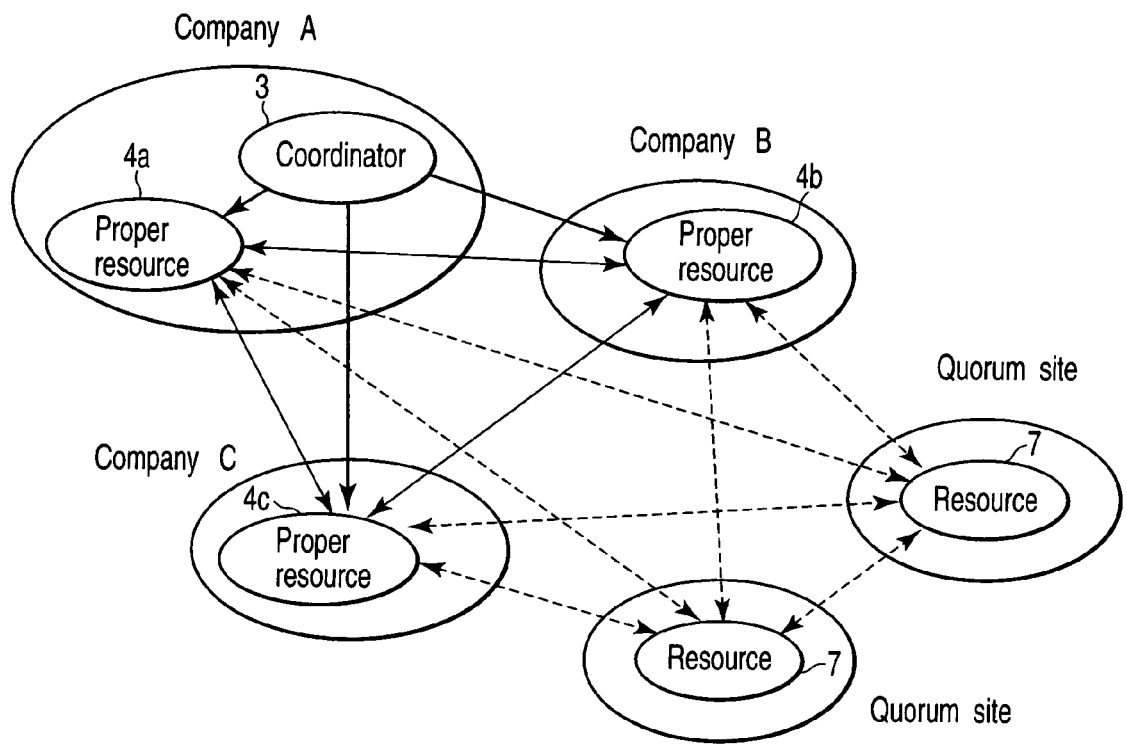
FIG. 15 illustrates communication between the coordinator and resources of the distributed system in the case where quorum sites according to the embodiment are introduced.

In addition, in the case of using quorum sites, the commit method of this invention can be slightly modified in order to reduce communication between resources. In the non-faulty normal process applying the modified commit protocol, no communication occurs between the resources of the quorum sites and the original resources, nor between the resources of the quorum sites and the coordinator (FIG. 15). Thereby, when no failure occurs, the transaction can advantageously be committed or aborted without communication with the resources of the quorum sites. The quorum sites are only involved when failure occurs in the original resources. Therefore, many transactions and resources can be handled with one quorum site.

The principle in the case of using the quorum sites is explained below in detail. In particular, the part relating to the reduction in communication traffic is explained.

Figure 16:
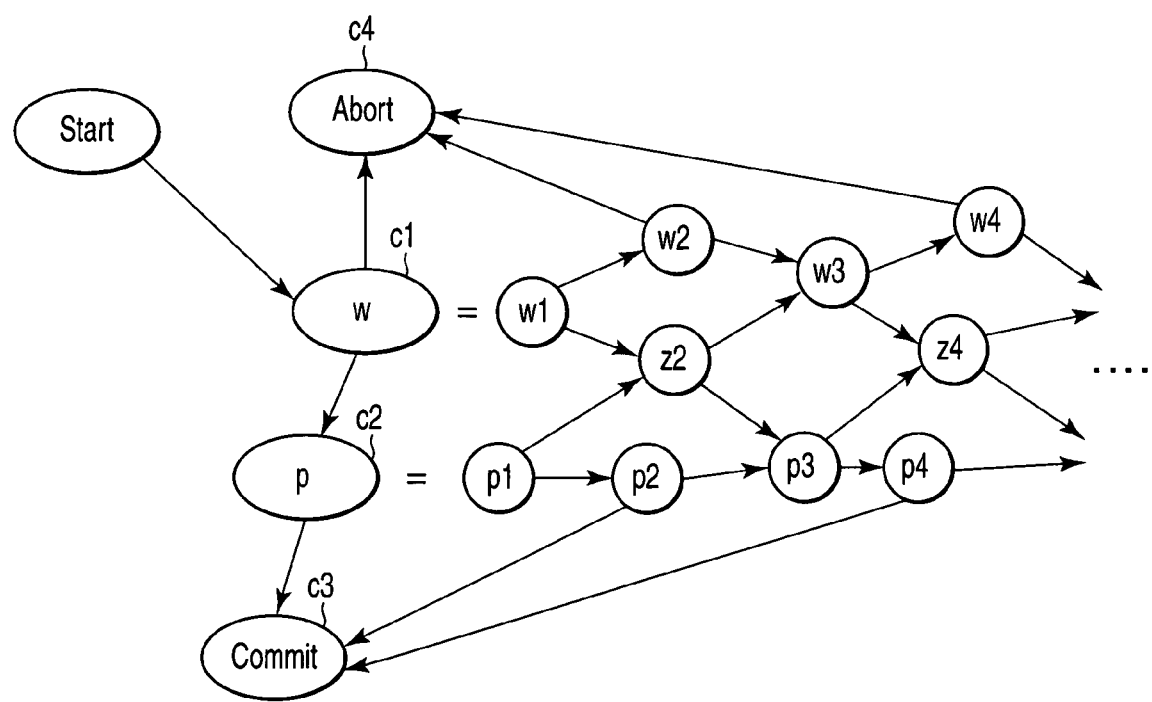
FIG. 16 illustrates a state transition of a resource in the distributed system in the case where quorum sites according to the embodiment are introduced.
Figure 17:
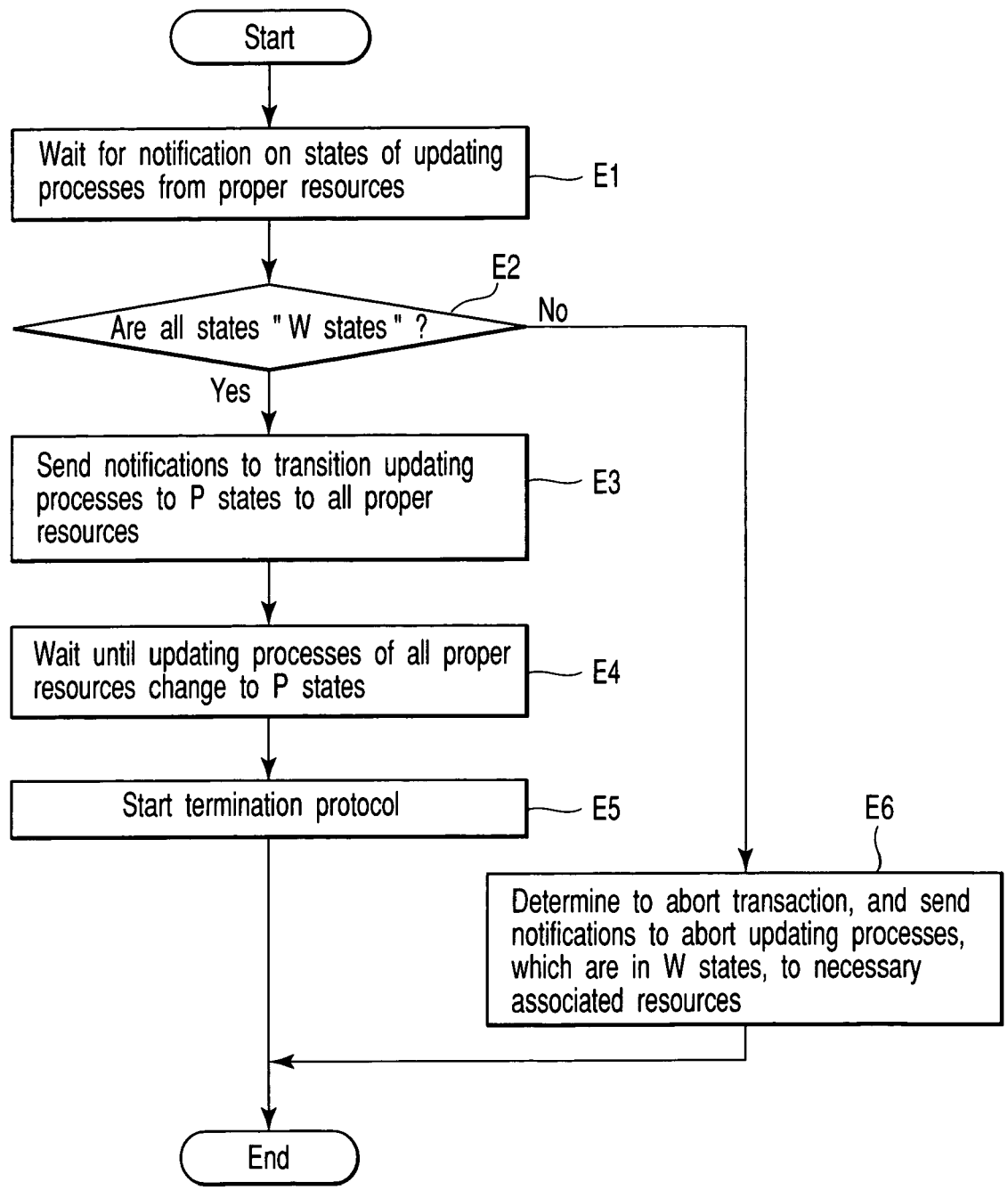
FIG. 17 illustrates an operational procedure of a coordinator in the case where quorum sites according to the embodiment are introduced.

In a modification of the procedure of the coordinator, it is considered that the updating process of quorum resource has automatically changed to the W state, and the coordinator pretends to be notified it without communication with the resource of the quorum site. After the coordinator notifies the N original resources the transition to the P state, in place of notifying quorum resources of the transition to the P state, the coordinator starts the termination protocol. FIG. 16 is a state transition diagram of the quorum site 6 in this modified version, and FIG. 17 is an operational flow of the coordinator 3.

In a modification of the termination protocol of the present invention, it is pretended as if failure occurred in the communication with quorum resources at the first step number 1 and step number 2, and the same protocol is executed without communication with quorum resources on step 1 and 2. Then, because of the nature of the algorithm, the updating processes of all original resources are committed at the end of step number 2 if no failure occurs in the original resources.

As described above, in the modified commit procedure of this invention, the termination protocol is executed even when no failure occurs. However, when no failure occurs, the transaction is committed at step number 2. Thus, the transaction which should be committed will never be aborted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distributed system including a plurality of computers, the distributed system executing a distributed transaction using 3 Phase Commit, each of the plurality of computers comprising:

a state transition control unit configured to change states of updating processes of each of the plurality of computers in accordance with a notification from a coordinator which coordinates state transitions of the updating processes, each of the updating processes relating to the distributed transaction using 3 Phase Commit; and a termination protocol unit configured to collect the states of the updating processes of the plurality of computers, and to determine whether to commit or abort the updating processes of each of the plurality of computers, on the basis of the collected states of the updating processes, the termination protocol unit executing an agreement algorithm using the collected states of the updating processes as respective initial values, and determining whether the updating processes of each of the plurality of computers are to be committed or aborted on the basis of an agreement result in a case where agreement is obtained among more than half the plurality of computers.

2. The distributed system according to claim 1, wherein the termination protocol determines to commit the updating processes of each of the plurality of computers in a case where a commit state exists among the collected states of the updating processes, and determines to abort the updating process of each of the plurality of computers in a case where an abort state or an updating state exists among the collected states of the updating processes.

3. The distributed system according to claim 2, wherein a total number of the plurality of computers is 2N−1(2N−1>3), and (N−1) (N−1>1)computers of the (2N−1)computers are not substantially associated with execution of the distributed transaction and execute only a state transition of their respective updating processes.

4. The distributed system according to claim 3, wherein N computers of the (2N−1)computers are substantially associated with the execution of the distributed transaction, and the termination protocol units of the N computers determine, as long as no specified event occurs, to commit or abort their respective updating processes on the basis of states of updating processes which are collected by the N computers, without collecting states of updating processes from the (N−1) computers.

5. The distributed system according to claim 1, wherein a total number of the plurality of computers is 2N−1, (2N−1>3) and (N−1) (N−1>1)computers of the (2N−1)computers are not substantially associated with execution of the distributed transaction and execute only a state transition of their respective updating processes.

6. The distributed system according to claim 5, wherein N computers of the (2N−1)computers are substantially associated with the execution of the distributed transaction, and the termination protocol control units of the N computers determine, as long as no specified event occurs, to commit or abort their respective updating processes on the basis of states of updating processes which are collected by the N computers, without collecting states of updating processes from the (N−1) computers.

7. The distributed system according to claim 1, wherein a total number of the plurality of computers is 2N−1(2N−1>3), and (N−1) (N−1>1)computers of the (2N−1)computers are not substantially associated with execution of the distributed transaction and execute only a state transition of their respective processes.

8. The distributed system according to claim 7, wherein N computers of the (2N−1)computers are substantially associated with the execution of the distributed transaction, and the termination protocol units of the N computers determine, as long as no specified event occurs, to commit or abort their respective updating processes on the basis of states of updating processes which are collected by the N computers, without collecting states of updating processes from the (N−1) computers.

9. A computer which executes a distributed transaction by using 3 Phase Commit along with a plurality of other computers that are connected over a network, comprising:

a state transition control unit configured to change a state of an updating process in accordance with a notification from a coordinator which coordinates state transitions of the updating process, the updating process relating to the distributed transaction using 3 Phase Commit; and a control termination protocol unit configured to collect states of updating processes of the other computers, and to determine whether to commit or abort the updating process, on the basis of the state of the updating process and the collected states of the updating processes of the other computers, the termination protocol unit executing an agreement algorithm using the collected states of the updating processes of the other computers as respective initial values, and determining whether the updating process to be committed or aborted on the basis of an agreement result in a case where agreement is obtained among more than half the plurality of computers.

10. A state transition control method for a distributed system including one or more computers executing a distributed transaction using 3 Phase Commit, each of the plurality of computers executing the steps of:

changing states of updating processes of each of the plurality of computers in accordance with a notification from a coordinator which coordinates state transitions of the updating processes, each of the updating processes relating to the distributed transaction using 3 Phase Commit, and executing a termination protocol by collecting the states of the updating processes of the plurality of computers, and determining whether to commit or abort the updating processes of each of the plurality of computers, on the basis of the collected states of the updating processes, the executing a termination protocol including executing an agreement algorithm using the collected states of the updating processes as respective initial values, and determining whether the updating processes of each of the plurality of computers are to be committed or aborted on the basis of an agreement result in a case where agreement is obtained among more than half the plurality of computers.

* * * * *

UNITED STATES PATENT AND TRADEMARK OFFICE
CERTIFICATE OF CORRECTION

PATENT NO. : 7,523,113 B2 Page 1 of 1
APPLICATION NO. : 11/354034
DATED : April 21, 2009
INVENTOR(S) : Endo It is certified that error appears in the above-identified patent and that said Letters Patent is hereby corrected as shown below:

Claim 3, column 11, line 17, change "(2N-1>3)" to -- (2N-1>=3) --.

Claim 3, column 11, line 18, change "(N-1>1) to -- (N-1>=1) --.

Claim 3, column 11, line 18, insert space before "computers" (both instances).

Claim 5, column 11, line 32, change "(2N-1>3)" to -- (2N-1>=3) --.

Claim 5, column 11, line 33, change "(N-1>1)" to -- (N-1>=1) --.

Claim 5, column 11, line 33, insert space before "computers" (both instances).

Claim 6, column 11, line 38, insert space before second instance of "computers".

Claim 7, column 11, line 47, change "(2N-1>3)" to -- (2N-1>=3) --.

Claim 7, column 11, line 48, change "(N-1>1)" to -- (N-1>=1) --.

Claim 7, column 11, line 48, insert space before "computers" (both instances).

Claim 8, column 11, line 53, insert space before "computers".

Claim 9, column 12, line 16, change "control termination" to -- termination --.

Signed and Sealed this

Second Day of June, 2009

JOHN DOLL
*Acting Director of the United States Patent and Trademark Office*